(12) United States Patent
Koning et al.

(10) Patent No.: US 9,594,698 B2
(45) Date of Patent: Mar. 14, 2017

(54) LOCAL KEYING FOR SELF-ENCRYPTING DRIVES (SED)

(71) Applicant: Dell Products, LP, Round Rock, TX (US)

(72) Inventors: G. Paul Koning, New Boston, NH (US); Damon Hsu-Hung, Providence, RI (US); Stuart L. Hollander, Merrimack, NH (US)

(73) Assignee: Dell Products, LP, Round Rock, TX (US)

( * ) Notice: Subject to any disclaimer, the term of this patent is extended or adjusted under 35 U.S.C. 154(b) by 239 days.

(21) Appl. No.: 13/966,035

(22) Filed: Aug. 13, 2013

(65) Prior Publication Data

US 2015/0052369 A1 Feb. 19, 2015

(51) Int. Cl.
*H04L 9/08* (2006.01)
*G06F 21/78* (2013.01)
*G06F 21/60* (2013.01)
*G06F 12/14* (2006.01)

(52) U.S. Cl.
CPC .......... *G06F 12/1408* (2013.01); *G06F 21/78* (2013.01); *H04L 9/085* (2013.01); *H04L 9/0894* (2013.01); *G06F 2221/2107* (2013.01); *H04L 9/0861* (2013.01); *H04L 9/0891* (2013.01)

(58) Field of Classification Search
CPC ... G06F 21/602; G06F 12/1408; H04L 9/085; H04L 9/0861; H04L 9/088; H04L 9/0891; H04L 9/0894
See application file for complete search history.

(56) References Cited

U.S. PATENT DOCUMENTS

| 7,236,956 B1* | 6/2007 | Ogg | G06F 21/602 400/401 |
|---|---|---|---|
| 8,190,945 B2 | 5/2012 | Nadeau et al. | |
| 2008/0101596 A1* | 5/2008 | Cerruti | G06F 21/602 380/30 |

(Continued)

OTHER PUBLICATIONS

Adi Shamir, "How to Share a Secret", Nov. 1979, Communications of the ACM, 22(11); pp. 612-613.*

(Continued)

*Primary Examiner* — Eleni Shiferaw
*Assistant Examiner* — Nelson Giddins
(74) *Attorney, Agent, or Firm* — Hamilton, Brook, Smith & Reynolds, P.C.

(57) ABSTRACT

A method and system self encrypts a disk storage device. Given a plurality of data storage devices, the system establishes an encryption key for the plurality of data storage devices. The system locally stores the encryption key in a piecewise manner throughout the plurality of data storage devices such that the encryption key is rendered undeterminable with less than a threshold subset of the plurality of data storage devices. This results in the plurality of data storage devices being self encrypting. Upon an increase or decrease in the plurality, the system resplits the encryption key and locally stores the resulting pieces throughout the changed (increased/decreased) plurality of data storage devices. This renders the encryption key undeterminable with less than a new or revised threshold each time the plurality is changed.

19 Claims, 3 Drawing Sheets

(56) References Cited

U.S. PATENT DOCUMENTS

| | | | | |
|---|---|---|---|---|
| 2009/0077379 | A1* | 3/2009 | Geyzel | H04L 9/085 |
| | | | | 713/170 |
| 2009/0092252 | A1* | 4/2009 | Noll | H04L 9/083 |
| | | | | 380/277 |
| 2010/0031058 | A1* | 2/2010 | Kito | G06F 11/1435 |
| | | | | 713/193 |
| 2013/0010966 | A1* | 1/2013 | Li | H04L 9/0888 |
| | | | | 380/278 |
| 2013/0173931 | A1* | 7/2013 | Tzafrir | 713/193 |
| 2014/0037093 | A1* | 2/2014 | Park | H04L 9/0894 |
| | | | | 380/277 |
| 2014/0059356 | A1* | 2/2014 | Nesnow | 713/189 |

OTHER PUBLICATIONS

Shamir, A., "How to Share a Secret," *Communications of the ACM*, 22(11): 612-613 (Nov. 1979).

"TCG Storage Security Subsystem Class: Enterprise," Specification Version 1.0, Revision 1.0 (Jan. 27, 2009).

McGrew, D., et al., "Threshold Secret Sharing," Internet Draft found at http://tools.ietf.org/html/draft-mcgrew-tss-03 pp. 1-52 (Mar. 3, 2010).

\* cited by examiner

LOCAL KEYING FOR SELF-ENCRYPTING DRIVES (SED)

BACKGROUND OF THE INVENTION

A disk drive is a device implementing disk storage in which data are digitally recorded by various electronic, magnetic, optical or mechanical methods on disks (also referred to as the media). Disk storage is used in both computer storage and consumer electronic storage (e.g., audio CDs and video disks, standard DVD and Blu-Ray). To that end, disk drives may implement such disk storage with fixed or removable media. With removable media the device is usually distinguished from the media as in a compact disk drive and a compact disk. Notable types of disk drives are the hard disk drive (HDD) containing a nonremovable disk, the floppy disk drive (FDD) and its removable floppy disk, and various optical disk drives and associated optical disk media.

A hard disk drive stores data onto tracks, heads, and sectors of a disk. A sector is a segment of a track, and the track is a circle of recorded data on a single recording surface of a platter (an individual recording disk). The sector unit is the smallest size of data to be stored in a hard disk drive, and each file may have many sector units assigned to it. Digital disk drives are block storage devices. Each disk is divided into logical blocks (which may be larger or smaller than a physical sector). Blocks are addressed using their logical block addresses (LBA). Reading from or writing to disk happens at the granularity of blocks.

The disk drive interface is the mechanism/protocol of communication between the rest of the system and the disk drive itself. Storage devices intended for desktop and mobile computers typically use ATA (parallel ATA) and SATA (serial ATA) interfaces. Enterprise systems and other storage devices typically use SCSI (Simple Computer System Interface), SAS (serial attached SCSI), and FC (Fiber Channel) interfaces in addition to some use of SATA.

SCSI is popular on servers and high-performance workstations. RAID (Redundant Arrays of Independent Disks) servers also often use SCSI hard disks.

SUMMARY OF THE INVENTION

Self-Encrypting Drives (SED) are a new capability recently defined for SCSI (SAS) disks, standardized by the Trusted Computing Group (TCG). This standard (TCG Enterprise SSC V1.0 specification) introduces some new terminology as follows.

SED—Self Encrypting Disk (formerly known as Full Disk Encryption). This is a SAS (SCSI) disk that encrypts the data on the media, but the more visible and important property is that it provides for selective locking (by password) of ranges of LBAs.

Band—an LBA range on the disk. Except for Band 0, bands are contiguous (defined by start LBA and length) and must not overlap.

Global band or Band0—the portion of the disk not covered by other defined bands. Initially (when no other bands exist) this is the whole disk.

Media encryption key (or Data encryption key)—the key used to encrypt the data in a band. This key is not visible outside the drive. Each band has a distinct media encryption key.

PIN—the password that unlocks a band. A better term would be "band password". TCG also uses the term "Band-Master" for this band password.

MSID—Manufacturer System ID (printed on the disk label, and readable from the drive). This is the default value for all the other passwords.

CSID (or SID)—Customer System ID.

EraseMaster—the password that erases a band. This is distinct from the (regular) PIN/band password/Band Master, which unlocks the band. In one of Applicant's implementations, the Erase Master is set at the default value (the MSID).

The present invention is directed to Self-Encrypting Drives (SED) with local PIN/band password (generally encryption key) management. Applicants introduce new terminology to describe their implementation of SED support:

Share—a piece of the PIN/band password, created by Shamir's Secret Sharing algorithm or equivalent.

Key label—a label at the start of each non-spare disk (in Band 0), which contains a share and any other information necessary for the operation of the SED support machinery.

keyd—key daemon, a user mode program started at disk array startup. The key daemon is responsible for managing the key labels and computing the PIN from the shares, then sending the PIN to the disk driver to allow it to unlock the drives.

In embodiments, a method and system of self encrypting a disk storage device comprise:

providing a plurality of data storage devices;

establishing an encryption key (e.g., PIN) for the plurality of data storage devices; and locally storing the encryption key in a piecewise manner throughout the plurality of data storage devices such that the encryption key is rendered undeterminable with less than a threshold subset of the plurality of data storage devices. This results in the plurality of data storage devices being self encrypted. An encryption engine may establish the encryption key and piecewise locally store the encryption key accordingly.

In the method and system, the step of locally storing the encryption key in a piecewise manner may apply a secret sharing process. In embodiments, the secret sharing process is Shamir's secret sharing algorithm or the secret sharing process includes:

splitting the encryption key into N pieces (shares);

storing different ones of the pieces on N different ones of the plurality of data storage devices, such that the threshold subset of the plurality is (N+1)/2 of the data storage devices.

In embodiments, the plurality of data storage devices is a RAID (Redundant Array of Independent Disks) configuration.

In embodiments, the encryption key is an access key to a media encryption key encrypting data in a band of a data storage device. In some embodiments, the access key (invention encryption key generally) is a user-generated password.

In embodiments, the system redoes the piecewise local storing of the encryption key upon a change to (increase or decrease in) the plurality of data storage devices. Specifically the system splits the encryption key into a set of pieces that are different than the pieces before the changed (increased/decreased) plurality. The system stores different pieces of the set on different ones of the changed plurality of data storage devices. This redoing of the piecewise local storing of the encryption key renders the encryption key undeterminable with less than a new threshold, the new threshold being a subset of the changed plurality. Furthermore, pieces from the new set cannot be combined with pieces from the old set. Generating new shares (pieces)

whenever the drive configuration changes (for example, when a drive is removed or added) is a significant feature, because it means that an attacker cannot remove drives one at a time and gain access. To be successful, he would have to remove the threshold amount of (e.g. N/2) drives simultaneously.

Advantageously, embodiments of the present invention address the following security threats.

Embodiments cover a loss of drives. This includes intentional release of drives, for example for reuse or RMA (return merchandise authorization), as well as unintentional release such as theft of drives. RMA is the returning of failed devices to the seller. When the failed device is a disk drive, RMA can conflict with a customer's security standards if the disk has potentially recoverable sensitive data. The present invention provides that disk storage data will not be disclosed by loss of up to half of the disk drives in the array (not counting the spares). For systems with expansion chassis, "array" means the base array and the expansion shelves configured for it to use.

Embodiments cover loss of other array components, for example controller, flash cards, etc. None of these hold information that can be used to discover the encryption key.

Embodiments cover "cold memory" attacks such as those carried out against systems that have lost power, or controllers that have been extracted. Embodiments actively erase any keying material (e.g., shares) in DRAM.

Embodiments are not directed to loss of multiple array components, or loss of the entire array. The security machinery is self-contained, it does not depend on an external key management system. As a result, if the whole system is compromised, that compromises the data. Note in particular that the loss of half the number of drives in multiple drives at the same time will compromise the data on those drives and will compromise the encryption key for the drives (since they all share the same key). So in the case of RAID-10 configurations, it is possible for a thief to get the data on the whole array, by walking off with one of each of the mirrored pairs of disk drives.

Embodiments are not directed to removal of drives while power is maintained. This is the case given the fact that manufacturers do not lock the drive on loss of SAS link, but only on loss of power.

Embodiments are not directed to snooping the SAS link during unlock (thereby recovering the encryption key). This is the case for manufacturers not implementing the secure messaging option defined for the SED protocol.

Embodiments are not directed to insider attack. An administrator or other insider will continue to have the ability to access the data or to grant others access to the data, using whatever means and authorizations they normally possess (e.g., by logging into the system).

In some embodiments, drive encryption is accomplished by disk drives that have SED hardware built-in. SED protects at the whole-drive level.

Fundamental to embodiments are (1) redundant on-system key storage, and (2) no back door (bypass). The keys needed for unlocking and decrypting disk data are stored within the storage array across a plurality of storage devices, so that the failure of any one of those devices will not result in the loss of the on-system keys.

With regard to having no back door bypass, if the user manages to lose all shares of the encryption key, then his data is irrevocably lost. Note that the keying scheme described here has at least as much redundancy as RAID. If there are enough disks to have good RAID sets, then there are enough (sufficient number of) disks to obtain the encryption key.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows. A description of preferred embodiments of the invention follows.

Generally speaking, secure storage may be constructed by encrypting of the data with a data encryption key, or by using storage elements (e.g., disk drives) that must be unlocked with a password (PIN), or by a combination of such methods. For non-limiting example, the TCG SED standard defines a storage device that can be locked and that also encrypts the data on the media. The encryption key is held within the drive and not disclosed, and the unlock password (PIN) allows the drive to retrieve the encryption key and use it to process the stored data. In all such cases, security depends on a secret value—the data encryption key or the unlock password—which must be known to the storage array for it to access the stored data. That secret value can be supplied by an operator at startup, or obtained from an external server, or stored within the storage array. If supplied by an operator, unattended restart is not possible. If an external server is used, this adds complexity to the system. Storing the secret within the storage array allows for unattended operation without dependency on any external hardware, but the secret must be stored in a manner that does not allow an attacker to compromise it easily. The present invention addresses this. In the discussion that follows, secure storage with TCG SEDs will be used to illustrate the invention, but the invention applies more generally to any type of secure storage in which a secret value is needed to access stored data.

Figure 1:
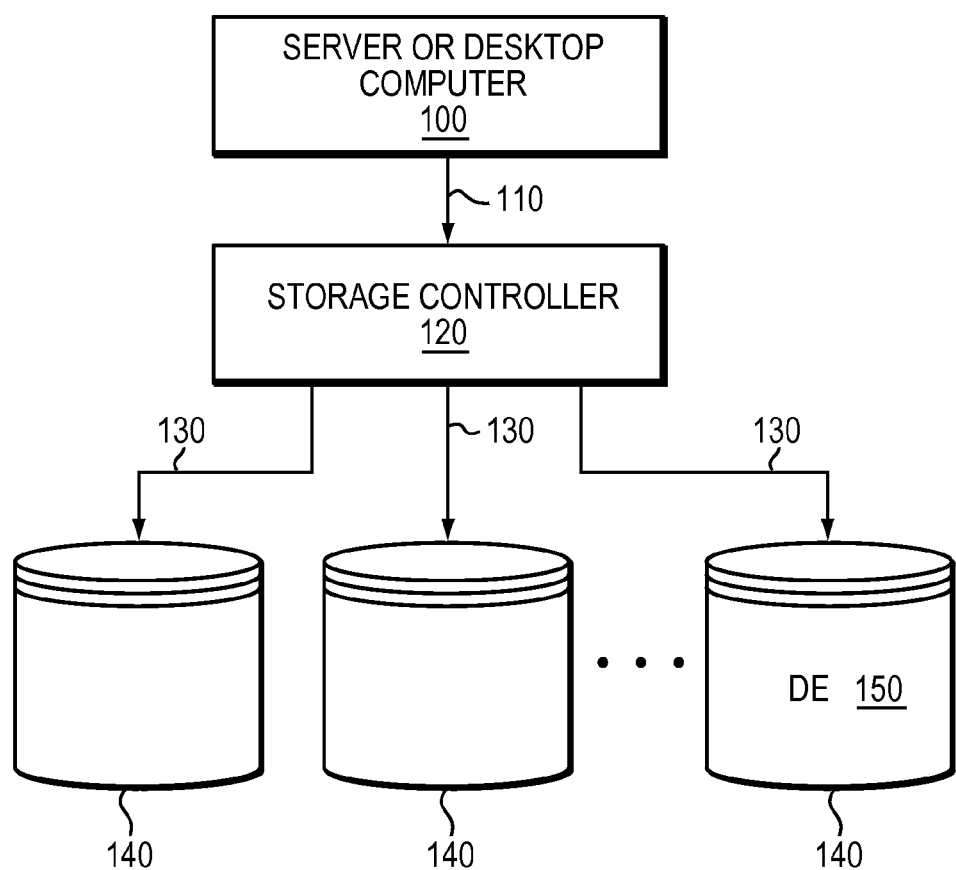
FIG. 1 is a schematic view of a computer system with disk storage embodying the present invention.

FIG. 1 shows a computer system, which may be a server system or a user workstation such as a desktop or laptop computer. The host or base computer 100 (the central processor of the computer system excluding its attached storage), connects to a storage controller 120. The storage controller 120 may be a simple disk controller, or it may incorporate more advanced storage mechanisms such as Redundant Array of Independent Disks (RAID). The computer 100 is connected to the controller 120 via an interconnect 110. The interconnect may be a system bus such as the Peripheral Component Interface (PCI) bus, or it may be a Storage Area Network (SAN) based on Fibre Channel or other SAN technology. The storage controller 120 in turns connects to one or more disk drives 140, via disk channels 130. The disk channels may be provided any suitable disk drive interface such as Advanced Technology Attachment (ATA), Small Computer System Interface (SCSI) or other disk interfaces.

The processes described below may be implemented in computer 100, in storage controller 120, or within drive electronics 150 contained in the disk drives 140. When implemented in computer 100, typically the implementation would be part of the operating system or device drivers installed in that computer.

In addition, the processes described below might be implemented in part in one component and in part in another. For example, one part of the processes might be implemented in disk drives 140, while another part is implemented in storage controller 120.

Modern SEDs (self encrypting disk drives) are built upon an industry standard—the Trusted Computing Group (TCG) Enterprise SSC V1.0 specification. In older SED products, the hardware encryption engine would simply use the encryption key provided by the user. TCG-compliant SEDs add a layer of indirection. The hardware engine (e.g., processor 100, storage controller 120, or disk drives 140/ electronics 150) uses a completely random key generated by a NIST-approved random number generator. This randomly generated Media Encryption Key is not accessible to any external interface, and in preferred embodiments the Media Encryption Key does not leave the disk drive 140. Next the user configures a password or PIN that functions as an Access Key which is used to encrypt the Media Encryption Key. The results of the Access Key/PIN encrypting the Media Encryption Key are stored in a reserved position of the disk drive 140. The terms "Access Key" or "PIN" are used interchangeably herein with the generic term "encryption key" of various embodiments of the present invention.

This is as secure but much more flexible than encrypting directly with the Access Key (encryption key). The Access Key can be changed without affecting the encrypted data, because the Media Encryption Key remains unchanged. If data were encrypted with the Access Key, as in the past, then changing the Access Key would destroy the encrypted data. Likewise, overwriting the Media Encryption Key destroys the encrypted data, resulting in an instantaneous cryptographic erasure of the entire disk drive 140.

In one embodiment an "EraseMaster" password or key authorizes the pertinent operation, which tells the disk drive 140 to wipe its Access Key and Media Encryption Key, and unlock. Typically, The EraseMaster password key remains at its default value, the MSID. The MSID is a per-drive value but can be read from the disk drive 140.

If an SED is not configured with an Access Key (encryption key), then data is readable as if the disk drive were not self-encrypting.

If an SED is configured with an Access Key (encryption key generally), then the Access Key must be provided in order to unlock the disk drive 140, which remains unlocked only while powered. The disk drive 140 locks itself upon losing power or shutting down, and the Access Key must be provided again to unlock the disk drive 140. Thus the Access Key is what unlocks the user data (and other functions, like firmware update).

Figure 2:
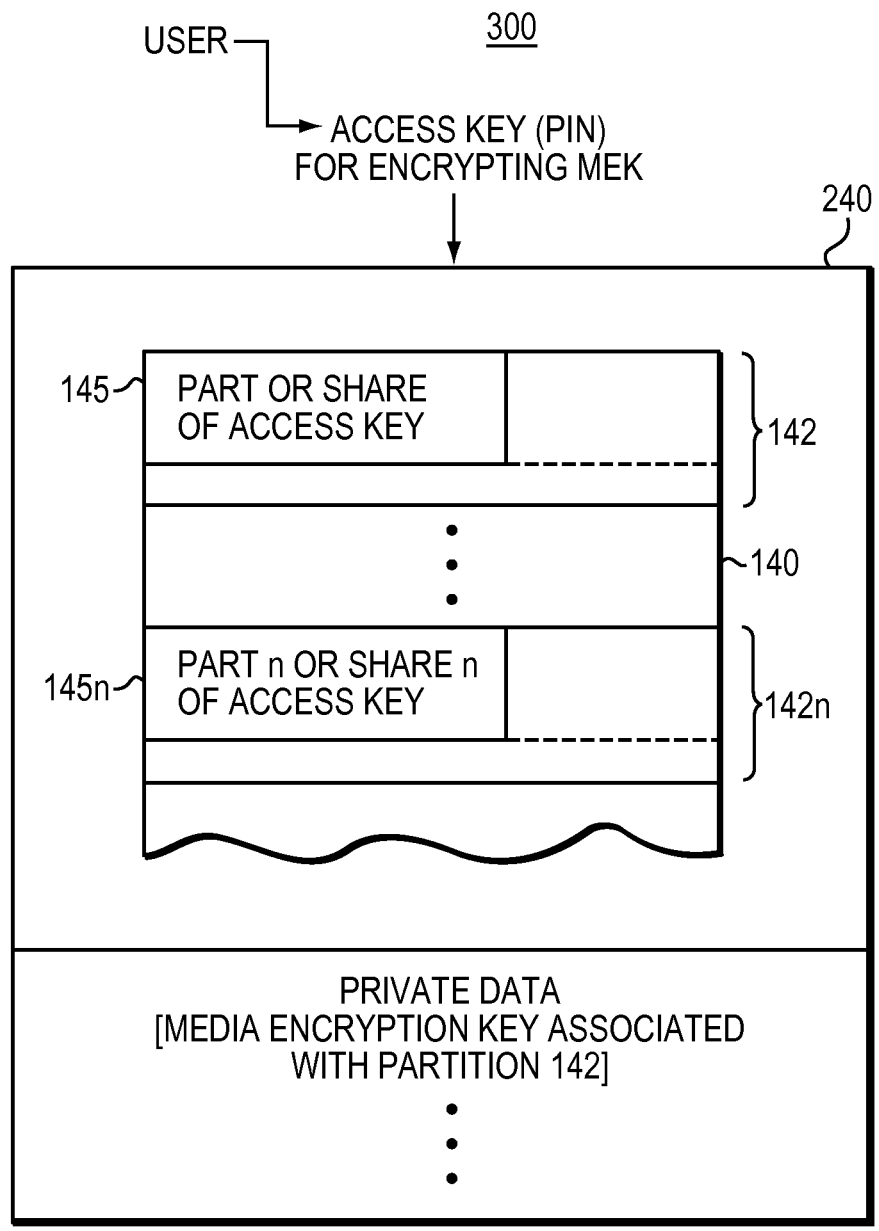
FIG. 2 is a block diagram of a disk drive system embodying the present invention.

As illustrated in FIG. 2, the above can also be applied to partitions 142 . . . 142n of an SED 240 (called bands by the TCG). Each partition 142, 142n is associated with a respective Media Encryption Key and has an optional Access Key (called a BandMaster by the TCG and referred to herein as the "PIN" or "band password"). Through the SED 240 engine (e.g., processor 100, storage controller 120, or disk drive electronics 150), a user configures a small unsecured band for drive labels 145, . . . 145n followed by a single secured band spanning the rest of the disk drive 140. The drive labels 145, . . . 145n contain the respective shares or pieces of the Access Key/PIN (encryption key generally). In particular, embodiments 300 of the present invention protect the Access Key or PIN (encryption key generally) in this way.

Figure 3:
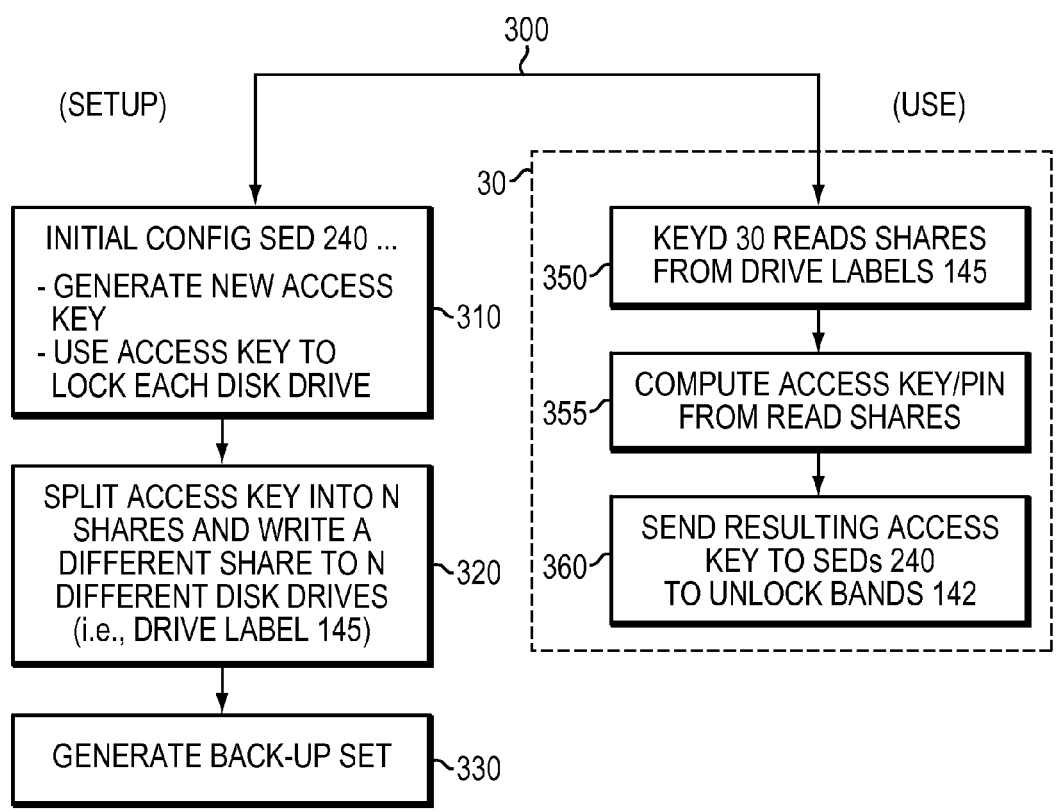
FIG. 3 is a flow diagram of the self encryption process and key management process in the embodiment of FIG. 2.

By way of overview, FIG. 3 illustrates redundant on-system encryption key storage by a preferred embodiment 300 of the present invention. The encryption key (Access Key/PIN) needed for unlocking and decrypting disk data is stored in pieces, shares or other partial amounts with the storage array across a plurality of storage devices, so the failure of any one storage device 140, 240 does not result in loss of the on-system encryption key.

The present invention 300 is a self-contained keying system, requiring no external Key Management Service (KMS). Exclusive to Applicant, automatic local keying relies upon the concept of cryptographic secret sharing described by Adi Shamir and specified in the Internet Draft "Threshold Secret Sharing" by David McGrew, Network Working Group Internet Draft (draft-mcgrew-tss-03). See Shamir, Adi, "How to Share a Secret", Communications of the ACM, 22(11):612-613, 1979. This secret sharing algorithm is a threshold secret sharing algorithm which means that it splits a secret value into N pieces (called "shares") such that one can compute the secret value if one has M (the threshold number) of shares, but one has no data whatsoever (not even a slight hint) about the secret value if one has M−1 pieces, or fewer.

With current generation enclosures, one has only two places to store shares: (1) the disk drives 140, and (2) the controllers 120. However, in a single controller system, the sole controller is not a good place to store a share because that would not be fault tolerant. For this reason, Applicants spread the shares across the disk drives 140, 240 that are members of RAID sets (i.e., the non-spare drives). Given N non-spare drives 140, 240, the splitting is done to a threshold of N/2 rounded up. In mathematical terms, the splitting is chosen to produce N pieces with a threshold of (N+1)/2. For example, if one has a small storage array with 8 drives where one drive is a spare and the remainder form a RAID set, then N is 7 so the threshold is 4 (=7/2 rounded up=(7+1)/2). Thus one needs 4 good drives to recover the secret value (i.e., Access Key/PIN). The reason to pick this threshold value is that, in a preferred embodiment, no RAID configuration with fewer than N/2 working disk drives 240, 140 can be functional and there is no need to be able to unlock a non-functional configuration.

Continuing with FIG. 3, when a system comprising an array of SED devices 240, controllers 120 and controller software implementing the present invention is initially configured, the engine 300 (step 310) of the present invention generates a new and unique Access Key (encryption key). Every disk drive 140, 240 including spares in the system will be locked with this one Access Key (encryption key).

In one embodiment, when the RAID set is configured after setup of the system, the invention engine 300 generates the new Access Key (encryption key). The present invention 300 obtains the Access Key data from a /dev/random function or equivalent operation. The Access Key is used for all disk drives in the array, including spares. The Access Key is per-array. That is, if multiple arrays have SED drives 240, each member generates the Access Key separately, so the PINs (Access Keys) are different even if the arrays belong to the same cluster or network.

The Access Key (encryption key) length is 32 bytes in one embodiment. This is the maximum length currently specified in the TCG Specification (and also the maximum length supported by certain manufacturers). It is understood that embodiments can support disk drives 140, 240 that have other Access Key length limits, for example, embodiments can truncate the 32 byte internal key to the shorter length supported by the disk drive at the time the PIN/Access Key is sent to the drive.

Then, step 320 (FIG. 3) uses the Shamir algorithm and splits the Access Key (encryption key) into any desired number of pieces, called shares, which have the following advantageous properties:

1. For each set of shares, one can choose how many shares are needed to recover the Access Key (for instance, 2-out-of-3, or 10-out-of-20). This is the threshold.

2. Every time the Access Key is split into a set of shares, the shares will be different even though the Access Key overall stays the same. Shares can only be combined with shares from the same set; they are incompatible with shares from any other set.

3. Shares, one or more at a time, disclose no information about the Access Key until the threshold number of shares is reached.

The preferred embodiment 300 chooses to split the Access Key (encryption key) such that at step 320 a different share is written to each of N active disk drives 140, 240 in the system (that is, non-spare, non-failed, non-foreign drives). In particular, the preferred embodiment (Step 320) stores the respective share in the drive label 145 of the corresponding disk drive 140, 240.

The threshold is always at least half the number (N) of storing disk drives; more precisely, it is (N+1)/2. Therefore, the array can automatically unlock itself whenever half of the N disk drives 140, 240 are present. For the same reason, an adversary must possess half of the disk drives from the same array in order to unlock the disk drives 140/SED 240.

Next, the invention engine 300 (step 330) generates a backup set to allow the Access Key (encryption key) to be recovered even if most of the key labels are unavailable. Keys may be unavailable due to software bugs or because one drive is being worked on in a forensics setting, for example. In a preferred embodiment, the backup set is a set of three shares with a threshold of two. The three shares can be saved offline, for example as printouts or small files on a memory stick, etc. and securely stored by the administrator. In one embodiment, the three shares are stored separately from each other so that a person who gains access to one of the shares does not have access to the other two.

Subsequently during use of the disk array, at system startup, a user mode daemon (keyd) 30 on the active controller 120 reads from drive labels 145 the key shares and computes the Access Key (encryption key) by Shamir's algorithm (step 350, 355). The Access Key daemon 30 (step 360) then sends the computed Access Key to the kernel for use by the disk drives 140, 240 of the array to unlock respective bands 142. Step 360 also sends the computed Access Key to the secondary controller, because the secondary controlling will need to know the Access Key/PIN on controller failover. Failover itself does not lock the disk drives 140, 240, but some error recovery cases in the disk drive power cycle a drive, which means the pertinent drive processor has to know the Access Key in order to unlock that drive after powering it back up.

At power fail, crash, or controller pull, all key-related data is wiped from DRAM. This defeats the "cold DRAM" attack. This wiping must be done before the crash dump code, to ensure that dumps do not contain Access Key (encryption key) data.

Debugging mechanisms that provide access to controller memory, such as the Unix device names /dev/mem or /dev/kmem, or any other system debug tools that include a memory read facility, must check the supplied memory address against the addresses where Access Keys (encryption keys) data is kept, and refuse to examine those locations.

When a disk drive 140, 240 disappears (which triggers RAID rebuild) for some reconfiguration (e.g., drive changes state or "fails" or "retries"), embodiments re-split the Access Key/PIN and write the new split values ("shares") to the protected disks. That way, a thief can not steal disk drives 140, 240 one at a time and gradually build up a whole RAID set. The different disk drives have shares on them from different split operations (of step 320), which can not be used to compute the secret value (e.g., Access Key or encryption key). The re-splitting is done immediately if the RAID sets are still all functional. If any RAID sets are faulted, then the re-split is not done at that time but is marked as pending, and will be done if the RAID fault is cleared.

Since some disk drives become unusable if there are too many consecutive unlock failures, the drive processor has to be careful not to retry unlock failures more than once or twice. If an unlock fails hard, the drive processor must stop trying and report the problem. The key daemon 30 receives that report and can take other pertinent action. In some embodiments, key daemon 30 will log the report but not do anything else unless specifically instructed. The key daemon 30 can also keep a count of failures, which is cleared on successful unlock. If that count reaches half the limit of the drives (for non-limiting example, 500 for disk drives that have a limit of 1000) then no further unlock attempts are made even on array powerfail or restart. An explicit action—for example, key restore from backup, or other operator override—is required to attempt another unlock. At this point the array is down but the disk drives are not yet unusable, and can as a minimum be wiped of the Access Key and Media Encryption key and unlocked (via EraseMaster and array reset) and redeployed.

Spare disk drives are keyed with the same Access Key (encryption key) as non-spares. However, spares do not have a key label, and they are not counted in the calculation of the Shamir sharing threshold (the integer number of shares needed to recover the Access Key). The reason for doing this is to make sure a spare disk drive can not serve as a tool for a malicious administrator to carry large quantities of data away from an array. When a spare disk drive is put into service as a regular disk drive, RAID can immediately start writing to it. At that time, it also notifies keyd 30. In response, keyd 30 re-splits the Access Key (encryption key) and writes the resulting shares in key labels 145 on the disk drives 140, 240 as usual; that includes the former spare disk drive that RAID is now using.

Since spares (disk drives) have the same Access Key (encryption key) as non-spares, they are unlocked at startup just as non-spares are. This allows RAID to start using a spare disk drive without waiting for keyd 30 to secure the drive.

If a spare disk drive is seen in the array but it cannot be unlocked with the array Access Key (encryption key), the assumption is that this is a spare that was pulled out of some other array. In that case, the subject spare disk drive is put into a "locked spare" state, awaiting admin intervention. The admin can then instruct the member to erase that spare disk drive and re-key it with the array Access Key. The reason for requiring user intervention is to give the admin an opportunity to pull the disk drive if it was not a real spare and should not be erased.

In embodiments, at the time SED 240 is enabled (when the RAID type is configured), the user interface supplies key backup data (from Step 330) to the user.

The backup is preferably in the form of three standard TSS key shares with a threshold of two. In other words, the Access Key (encryption key) is broken into three parts and any two of the parts are sufficient to reconstruct the Access Key. Each share may be written to a separate file, which is a text file containing the share as a hexadecimal string, in a single line. Other configurations are suitable.

Alternatively, the three shares may be shown to the user as hexadecimal strings, for cut and paste. In either case, a message is displayed urging the user to copy and safeguard the backup data.

In embodiments, there is a mechanism to ask for a new backup. This is useful if one of the shares is lost or compromised. If that happens, in one embodiment the recovery process specifies to the users to destroy any remaining shares of the old backup, and creates a new backup. Note that this is not rekeying: the Access Key (encryption key) remains unchanged.

The shares conform to the draft RFC TSS specification, which means that a data forensics shop that needs to unlock a user's drives for the user can do that with the key backup shares in hand.

If the disk drives 140, 240 can not be unlocked at startup, either because there are not enough of them (at least the threshold number of drives), or because the key material on the disk drives is not useable for some reason, the user can supply the backup data to the keying daemon (keyd) 30. This is done by invoking keyd 30 from a pertinent command, with the hex string representation of the shares (two are required) as an argument.

To illustrate how embodiments handle security threats in practice, first consider the question: "How do I destroy a set of shares?" Of course, it would suffice to erase every share. But, less obviously, it would suffice to erase just enough shares so that the remaining shares cannot recover the Access Key (encryption key). If two shares are erased from the backup set, the remaining share is useless; it is not half of a key, or one-third of an Access Key (encryption key), it is not usable at all.

Now consider an enclosure with 22 active disk drives and 2 spares:

1. When the array is first set up, the preferred embodiments 300 generates shares for all the active disk drives, which in this example we call Set A. Because spares are excluded, Set A has 22 shares with a threshold of (22+1)/2=11. The preferred embodiment 300 then generates and displays for the array a backup, Set B. Set B has three shares with a threshold of two.

2. Now remove a disk drive from the subject array. Immediately, the preferred embodiment 300 destroys Set A, which simply means erasing whatever is left of Set A: the remaining 21 shares. Now there are only 21 active disk drives. Engine 300 generates a new Set C of shares (21 shares) which then has a threshold of (21+1)/2=11. If another disk drive is removed, the engine 300 destroys Set C, replacing it with Set D, now 20 shares with a threshold of (20+1)/2=10.

3. If both disk drives were removed by the same adversary, he resultantly possesses one share from Set A and one share from Set C. However, each of those shares is useless by itself and they also cannot be combined with each other being from different sets of shares. The adversary must simultaneously remove from one set, at least 11 disk drives to obtain enough shares from the same set to potentially reconstruct the Access Key value.

During all of this, Set B (backup set) remains perfectly usable. However, the same process applies:

1. Suppose one of the shares from Set B is compromised. Immediately, the administrator should destroy Set B, which simply means erasing whatever is left of Set B: the remaining 2 shares.

2. Then, the administrator should generate a new backup set (formed of 3 shares), resulting in Set E. If a share from Set E is compromised, destroy Set E by erasing the remaining 2 shares, and generate Set G replacement backup set. The stolen share from Set B and the stolen share from Set E are useless individually and they also cannot be combined because they are from different SED sets. Indeed, they also cannot be combined with the shares stolen from Set A and Set C to potentially reconstruct the Access Key (encryption key).

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of self encrypting a disk storage device comprising:

providing a plurality of data storage devices;

establishing an access key for the plurality of data storage devices;

determining a media encryption key using a random number generator;

encrypting data stored on the plurality of data storage devices using the media encryption key; encrypting the media encryption key using the access key;

locally storing shares of the access key in a first piecewise manner throughout the plurality of data storage devices such that the access key is rendered undeterminable with less than a threshold subset of the locally stored shares stored on the plurality of data storage devices, resulting in the plurality of data storage devices being self encrypted;

generating a set of backup shares of the access key in a second piecewise manner being stored on a plurality of backup data storage devices, the set of backup shares of the access key remaining operable after removal or addition of any of the plurality of data storage devices and further remaining operable after change to the shares of the access key;

responsive to changing the plurality of storage devices:

re-computing a new piecewise manner to store the access key throughout the plurality of data storage devices, by splitting the access key into a set of shares that are different than the locally stored shares before the change to the plurality of storage devices; and storing different shares of the set of shares on different ones of the changed plurality of data storage devices, wherein the re-computing the new piecewise local storing of the access key renders the access key undeterminable with less than a new threshold, the new threshold being a subset of the changed plurality of data storage devices, wherein the change to the plurality of data storage devices is any of removal of one or more data storage devices from the plurality and addition of one or more data storage devices to the plurality, resulting in increase or decrease of a number of data storage devices of the plurality; and wherein the set of backup shares have shares with a different threshold subset from the threshold subset of the locally stored shares.

2. A method of claim 1 wherein the step of locally storing the access key in a piecewise manner applies a secret sharing process.

3. A method of claim 2 wherein the secret sharing process is Shamir's secret sharing.

4. A method of claim 2 wherein the secret sharing process includes:
splitting the access key into N pieces (shares);
storing different ones of the pieces on N different ones of the plurality of data storage devices, such that the threshold subset of the plurality is (N+1)/2 of the data storage devices.

5. A method of claim 1 wherein the plurality of data storage devices is a RAID (Redundant Array of Independent Disks) configuration.

6. A method of claim 1 wherein the encrypted data stored on the plurality of data storage devices is in a band of a data storage device.

7. A method of claim 1 wherein the access key is a user-generated password.

8. The method of claim 1, further comprising:
responsive to one of the set of backup shares being compromised, generating a new set of backup shares.

9. A self encrypting data storage system comprising:
a plurality of data storage devices; and
an encryption engine configured to:
establish an access key for the plurality of data storage devices,
determine a media encryption key using a random number generator,
encrypt data stored on the plurality of data storage devices using the media encryption key,
encrypt the media encryption key using the access key,
locally store shares of the access key in a first piece wise manner throughout the plurality of data storage devices such that the access key is rendered undeterminable with less than a threshold subset of the locally stored shares stored on the plurality of data storage devices, resulting in the plurality of data storage devices being self encrypted;
generate a set of backup shares of the access key in a second piecewise manner being stored on a plurality of backup data storage devices, the set of backup shares of the access key remaining operable after removal or addition of any of the plurality of data storage devices and further remaining operable after change to the shares of the access key;
upon a change to the plurality of data storage devices:
re-compute a new piecewise manner to store the access key throughout the plurality of data storage devices, by splitting the access key into a set of shares that are different from the locally stored shares before the change to the plurality of storage devices, and
store different shares of the set of pieces on different ones of the changed plurality of data storage devices,
wherein the re-computing the new piecewise manner of the access key renders the access key undeterminable with less than a new threshold, the new threshold being a subset of the changed plurality of data storage devices,
wherein the change to the plurality of data storage devices is any of removal of one or more data storage devices from the plurality and addition of one or more data storage devices to the plurality, resulting in increase or decrease of the plurality; and
wherein the set of backup shares have shares with a different threshold subset from the threshold subset of the locally stored shares.

10. The self encrypting data storage system of claim 9 wherein the encryption engine locally stores the access key in a piece wise manner by applying a secret sharing process.

11. The system of claim 10 wherein the secret sharing process is Shamir's secret sharing.

12. The system of claim 10 wherein the encryption engine applies the secret sharing process by:
splitting the access key into N pieces (shares);
storing different ones of the pieces on N different ones of the plurality of data storage devices, such that the threshold subset of the plurality is (N+1)/2 of the data storage devices.

13. The system of claim 9 wherein the plurality of data storage devices is a RAID (Redundant Array of Independent Disks) configuration.

14. The system of claim 9 wherein the encrypted data stored on the plurality of data storage devices is in a band of a data storage device.

15. The system of claim 9 wherein the access key is a user-generated password.

16. A data handling system comprising:
a plurality of data storage devices, the data storage devices being self-encrypting; and
an encryption engine configured to:
establish an access key for the plurality of data storage devices,
determine a media encryption key using a random number generator,
encrypt data stored on the plurality of data storage devices using the media encryption key,
encrypt the media encryption key using the access key,
locally store shares of the access key in a piece wise manner throughout the plurality of data storage devices such that the access key is rendered undeterminable with less than a threshold subset of the locally stored shares stored on the plurality of data storage devices, resulting in the plurality of data storage devices being self encrypted,
generate a set of backup shares of the access key in a second piecewise manner being stored on a plurality of backup data storage devices, the set of backup shares of the access key remaining operable after removal or addition of any of the plurality of data storage devices and further remaining operable after change to the shares of the access key; and
responsive to a change to the plurality of data storage devices:
(i) re-computing a new piecewise manner to store the access key throughout the changed plurality of data storage devices, by splitting the access key into a set of shares that are different than the locally stored shares used before the change to the plurality of storage devices, and (ii) store different pieces of the set of pieces throughout the changed plurality of data storage devices, wherein the re-computing the new piecewise manner of the access key renders the encryption key undeterminable with less than a new threshold, the new threshold being a subset of the changed plurality of data storage devices;

wherein the change to the plurality of data storage devices is any of removal of one or more data storage devices from the plurality and addition of one or more data storage devices to the plurality, resulting in increase or decrease of the plurality; and wherein the set of backup shares have shares with a different threshold subset from the threshold subset of the locally stored shares.

17. The system of claim 16 wherein the encryption engine locally stores the access key in a piece wise manner by applying a secret sharing process that includes:

splitting the access key into N pieces (shares);

storing different ones of the N pieces on N different ones of the plurality of data storage devices, such that the threshold subset of the plurality is (N+1)/2 of the data storage devices.

18. The system of claim 16 wherein the encrypted data stored on the plurality of data storage devices is in a band of a data storage device.

19. The system of claim 16 wherein the access key is a user-generated password.

* * * * *